(12) United States Patent
Chen et al.

(10) Patent No.: US 11,097,242 B2
(45) Date of Patent: *Aug. 24, 2021

(54) WET GEL GRANULE OF AEROGEL AND PREPARATION METHOD THEREOF

(71) Applicant: TAIWAN AEROGEL TECHNOLOGY MATERIALS CO., LTD., Tainan (TW)

(72) Inventors: Jean-Hong Chen, Tainan (TW); Shiu-Shiu Chen, Tainan (TW)

(73) Assignee: TAIWAN AEROGEL TECHNOLOGY MATERIALS CO., LTD., Tainan (TW)

(*) Notice: Subject to any disclaimer, the term of this patent is extended or adjusted under 35 U.S.C. 154(b) by 30 days.

This patent is subject to a terminal disclaimer.

(21) Appl. No.: 15/822,461

(22) Filed: Nov. 27, 2017

(65) Prior Publication Data

US 2019/0160446 A1 May 30, 2019

(51) Int. Cl.

| | |
|---|---|
| *B01J 13/00* | (2006.01) |
| *C08J 9/228* | (2006.01) |
| *C08J 3/075* | (2006.01) |
| *C08J 3/09* | (2006.01) |
| *C08J 9/28* | (2006.01) |
| *C08G 77/04* | (2006.01) |
| *C01B 33/16* | (2006.01) |

(52) U.S. Cl.
CPC ......... *B01J 13/0091* (2013.01); *C01B 33/163* (2013.01); *C08G 77/04* (2013.01); *C08J 3/075* (2013.01); *C08J 3/09* (2013.01); *C08J 9/228* (2013.01); *C08J 9/28* (2013.01); *C08J 2201/0502* (2013.01); *C08J 2205/024* (2013.01); *C08J 2205/026* (2013.01)

(58) Field of Classification Search
CPC ........ B01J 13/0091; C07F 7/1836; C07F 7/04
See application file for complete search history.

(56) References Cited

U.S. PATENT DOCUMENTS

| | | | | | |
|---|---|---|---|---|---|
| 2,134,625 | A | * | 10/1938 | Shappirio | ........... C10L 1/30 44/458 |
| 2,968,618 | A | * | 1/1961 | Thompson | ........... C10L 1/14 508/222 |
| 3,357,934 | A | * | 12/1967 | Marotta | ........... C09D 7/45 524/44 |
| 3,453,127 | A | * | 7/1969 | Marotta | ........... B01J 13/0091 106/169.55 |
| 3,525,689 | A | * | 8/1970 | Marotta | ........... C08K 3/36 508/140 |
| 5,391,364 | A | * | 2/1995 | Cogliati | ........... C01B 13/32 423/263 |

FOREIGN PATENT DOCUMENTS

| | | |
|---|---|---|
| TW | 200835648 A | 9/2008 |
| TW | 201641544 A | 12/2016 |

OTHER PUBLICATIONS

Glenz (Chemistry and Technology of Silicones, 1968, pp. 1-11).*

* cited by examiner

*Primary Examiner* — Kuo Liang Peng
(74) *Attorney, Agent, or Firm* — WPAT, PC

(57) ABSTRACT

A wet gel granule of aerogel is prepared by the following steps: mixing step: mixing with an organic mixed solvent to form a mixed solution; hydrolysis step: adding an acid catalyst to the mixed solution for carrying out a hydrolysis reaction, and adding a dispersion solvent during the condensation reaction, and agitating to gel the mixed solution during agitation and produce multiple hydrophilic or hydrophobic wet gel granules of aerogel. The overall preparation speed can be shortened quickly and at the same time the hydrophilic or hydrophobic wet gel granules of aerogel wet glue particles are prepared to increase the production efficiency of the wet gel granules of aerogel.

9 Claims, 5 Drawing Sheets

1 μm

100 μm

WET GEL GRANULE OF AEROGEL AND PREPARATION METHOD THEREOF

TECHNICAL FIELD

The present invention relates to a wet gel granule of aerogel and a process method thereof, in particular to a modified sol-gel condensation and dispersion synthesis for producing a more homogeneous spherical hydrophilic or hydrophobic particulate wet gel granule of aerogel, followed by drying to form hydrophilic or hydrophobic aerogel powder.

BACKGROUND OF THE INVENTION

Aerogel is a kind of porous material with three-dimensional network structure and has a very low thermal conductivity. Currently, aerogel is mainly used in thermal insulation materials.

The conventional preparation method of aerogel is sol-gel synthesis method, mainly by alkoxysilane, methyl silicate or other precursors mixed with organic solvents, and adding acid catalyst thereto for hydrolysis. After the hydrolysis reaction is carried out for a certain period of time, the alkali catalyst is added for the condensation reaction, and the sol-gel is gradually formed during the condensation reaction. The molecules in the sol-gel continue to undergo condensation reaction, and gradually formed semi-solid polymer gel, and after a period of aging the stable three-dimensional network structure of sol is then formed. Finally, the use of supercritical drying technology to extract solvent like water and methanol in aerogel system, and get porous dry lump aerogels.

Since the drying method used in the preparation of the above aerogel is a supercritical drying technique, it is possible to prevent the aerogel from cracking by the surface tension of the moisture during the atmospheric drying process. However, it is only suitable for a very small amount of aerogel dry, and not easy to mass production and reduce the production cost of aerogel because the supercritical drying technique to be carried out under high pressure.

On the other hand, the aerogel is usually used to crush the dry mass aerogel, but the general crushing method tends to make uneven structure and broken appearance of aerogel, so that it is difficult to obtain excellent heat insulating property.

TW Patent No. 104116983 "Aerogel Granule and Preparation Method Thereof" discloses the process of an aerogel granule, in which a hydrophobic dispersing solvent is added during the condensation reaction of aerogel, and agitating the mixture, so that the mixed solution is gelled during the agitation to produce a more homogeneous aerogel with a relatively uniform structure.

TW Patent Publication No. 200835648 "Porous Material and Method for Preparing the Same" discloses the porous material is made by sol-gel synthesis of mixture of alkoxysilane or silicate compounds and organic solvent, and modification by modifier, thereby substituting the hydrophilic functional group on the surface of the porous structural material for a hydrophobic functional group. Hence, the aerogel can be prevented from cracking by the influence of the surface tension of water and thus can be dried at room temperature under atmospheric pressure.

In previous patent publications, the hydrophobic modification of the aerosol is carried out by multi-step solvent replacement technology at room temperature under atmospheric pressure, but this kind of hydrophobic modification procedure should be carried out under normal temperature and pressure conditions for solvent replacement, for more than 24 hours. The process takes too long and not cost effectively.

Furthermore, the conventional aerogel powder is still difficult to disperse and easy to agglomerate, and cause the aerogel dust pollution in the follow-up processing.

SUMMARY OF THE INVENTION

In order to improve the subsequent uneven dispersion of the crushed aerogel powder and the contamination of the dust during the use of the aerogel, the present inventors have proposed a method for preparing a wet gel granule of aerogel. The method of preparing a wet gel granule of aerogel comprises steps of: mixing step: mixing a siloxane compound mixture with an organic mixed solvent to form a mixed solution; hydrolysis step: adding an acid catalyst to said mixed solution for carrying out a hydrolysis reaction; condensation and dispersion step: adding an basic catalyst to said mixed solution to carry out a condensation reaction, and adding a hydrophilic or hydrophobic dispersion solvent during the condensation reaction, and agitating, to gel said mixed solution during agitation and produce multiple hydrophilic or hydrophobic wet gel granules of aerogel. In the present invention, it is possible to easily prepare hydrophilic or hydrophobic wet gel granules of aerogel by adding the hydrophilic or hydrophobic dispersion solvent during the condensation step. The overall preparation will have a reduced speed ranging from 1 hour to 2 hours and can continuously produce hydrophilic or hydrophobic wet gel granules of aerogel, thereby improving the production efficiency of the wet gel granules of aerogel.

Furthermore, the siloxane compound mixture is one or more selected from the group consisting of the following substances: tetramethoxysilane (TMOS) or tetraethoxysilane (TEOS) or R-olefinyl trimethoxysilane (RTMS) or R-olefinyl triethylsilicate (RTES) or R-olefinyl silicone or R-olefinyl silicon coupling agent; wherein R-olefinyl is a functionally substituted olefin cluster, comprising Acid (—COOH), amino (—NH2), imino (=NH), hydroxy (—OH), ether (—COC—), epoxy (—COH—COH), thiol (—SOOH), halide (—X), phosphate (—$PO_3$), Sulfate (—$SO_4$), the number of carbon atoms of the olefinyl chain is from C1 to C13; R-olefinyl silicone: acid-based polydimethylsilicone (PDMS or DMDMS) or silicone precursor or R-silicon coupling agent.

Furthermore, the organic mixed solvent is one or more solvents selected from the group consisting of ketones, ethers, esters, aromatics or alkanes; Furthermore, the dispersion solvent comprises hydrophilic dispersion solvent and hydrophobic dispersion solvent depending on production requirements. The hydrophilic dispersion solvent is one or more solvents selected from the group consisting of water, alcohols, ketones, ethers, amines or acids. The hydrophobic dispersion solvent is one or more solvents selected from the group consisting of ketones, ethers, esters, aromatics or alkanes.

Furthermore, the condensation step comprises adding hydrophilic dispersion solvent: water, alcohols, ketones, ethers, amines or acid, allowing the wet granules of aerogel to present a hydrophilic group on a surface layer, such as —OH, —COOH or —$NH_2$, and the prepared wet gel granules of aerogel are hydrophobic wet gel granule; of aerogel; condensation step comprises adding hydrophobic dispersion solvent: ketones, ethers, esters, aromatics or alkanes; and then promoting the wet granules of aerogel to present a hydrophobic group on the surface layer, such as —CH$_3$, —X, —C$_2$H$_5$, and the prepared wet gel granules of aerogel are hydrophobic wet gel granules of aerogel.

Furthermore, a post-treatment step after the condensation step is provided, which includes: filtering a large amount of the dispersed solvent out of the wet granules of aerogel by a filter, to obtain wet granule of aerogel, and then drying, to form hydrophilic or hydrophobic aerogel powder.

The invention also provides a wet granule of aerogel which made by the following steps: mixing step: mixing tetramethoxysilane (TMOS) or tetraethoxysilane (TEOS) or R-olefinyl trimethoxysilane (RTMS) or R-olefinyl triethylsilicate (RTES) or R-olefinyl silicone or R-olefinyl silicon coupling agent with an organic mixed solvent to form a mixed solution; hydrolysis step: adding an acid catalyst to said mixed solution for carrying out a hydrolysis reaction; condensation step: adding a basic catalyst to said mixed solution to carry out a condensation reaction, and adding a hydrophobic or hydrophilic dispersion solvent during the condensation reaction, and agitating, to form wet gel granules of aerogel with hydrophilic or hydrophobic shell-core structure, and then drying to form hydrophilic or hydrophobic aerogel powder. The diameter of wet granules of aerogel could be 100 nm, or hundreds of nanometers to dozens of micrometers. The diameters, porosity and pore sizes of wet granules of aerogel can be regulated depending on preparation conditions, such as the content of the siloxane compound mixture and the solvents, the viscosity of the solvents, the content of the acid catalyst, and the basic catalyst, the content of the dispersed solvent, and the speed of stirring.

The present invention has following effects:

1. In the procedure of this invention, relatively structurally uniform spherical particulates of hydrophilic or hydrophobic wet granules of aerogel are produced by agitating large amount of incompatible solvents during the condensation step. The prepared wet granules are spherical and well-dispersed and thus better closed shell-layered wet granules of aerogel are obtained so as to improve utility of products.

2. The wet granules of aerogel made from the method of this invention contain lots of dispersion solvent, so the wet granules can be added directly into processing materials in subsequent processes in order to decrease problems like dust pollution of aerogel.

3. The method of this invention controls the hydrophilic and/or hydrophobic properties through adjusting the composition and content of siloxane compound mixture.

4. The method of this invention controls the content of solvents and the incompatible dispersion solvents and the stirring speed to manage the sizes of wet granules of aerogel in micron level. The wet granules of aerogel become smaller when the content of the solvent or/and the incompatible disperse solvent is higher and the stirring speed is faster. In contrast, the wet granules of aerogel becomes smaller when the content of the solvent is lower or/and the viscosity of the incompatible disperse solvent is smaller and the stirring speed is slower.

5. Hydrophilic or hydrophobic wet granules of aerogel is easily prepared by managing the addition of the hydrophilic dispersion solvent or hydrophobic dispersion solvent in the condensation step. The entire manufacturing time can be rapidly reduced to 1 hour to 4 hours to complete the preparation of hydrophilic or hydrophobic wet granules of aerogel.

DETAILED DESCRIPTION OF PREFERRED EMBODIMENTS

In view of the above technical features, the main effects of the hydrophilic wet granules of aerogel and the hydrophobic wet granules of aerogel of the embodiments of the present invention and their preparation methods will be clearly presented in the following examples.

Figure 1:
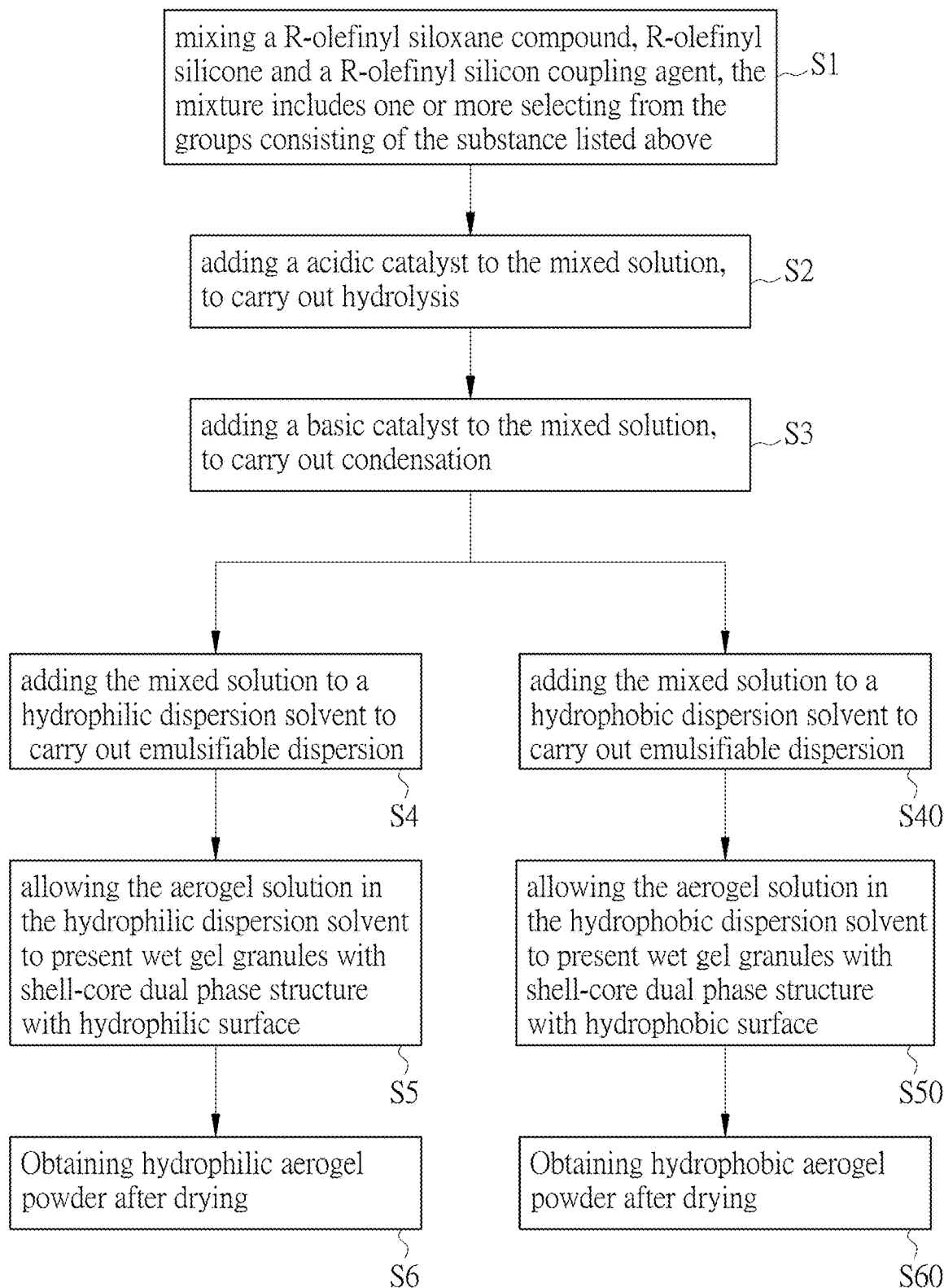
FIG. 1 is a step flow diagram of one embodiment according to the present invention.

Referring to FIG. 1, a method of preparing wet gel granule of aerogel includes the following steps: mixing step (S1), hydrolysis step (S2), condensation step (S4), formation of core-shell structure of the aerogel (S5) and subsequent drying step (S6), wherein:

the mixing step (S1): the siloxane compound mixture is one or more selected from the group consisting of the following substances: tetramethoxysilane (TMOS) or tetraethoxysilane (TEOS) or R-olefinyl trimethoxysilane (RTMS) or R-olefinyl triethylsilicate (RTES) or R-olefinyl silicone or R-olefinyl silicon coupling agent, wherein R-olefinyl is a functionally substituted olefin cluster, which includes acid (—COOH), amino (—NH$_2$), imino (═NH), hydroxy (—OH), ether (—COC—), epoxy (—COH—COH), thiol (—SOOH), halide (—X), phosphate (—PO$_3$), sulfate (—SO$_4$) and the like. The number of carbon atoms of the olefinyl chain is from C1 to C13; R-olefinyl silicone: acid-based polydimethylsilicone (PDMS or DMDMS) or silicone precursor or R-silicon coupling agent and the like, is mixed with an organic mixed solvent to form a mixed solution. The content of the siloxane compound mixture is between 1.2 mol % and 40 mol %. The content of the organic mixed solvent is between 98.8 mol % and 60 mol %.

The hydrolysis step (S2): adding an acid catalyst to the mixed solution for carrying out a hydrolysis reaction. Wherein, the content ratio of the siloxane compound mixture and the acid catalyst for hydrolysis is 1:0.5~1:0.00001.

Also, the content ratio of the siloxane compound mixture and the acid catalyst is 1:0.00001~1:0.5. The time of hydrolysis takes up to 500 minutes when the content ratio of the siloxane compound mixture and the acid catalyst is 1:0.00001. The time of hydrolysis takes up to 20 minutes when the content ratio of the siloxane compound mixture and the acid catalyst is 1:0.5. It can be seen that the time required for the hydrolysis reaction can be decreased as the acid catalyst content increases.

The condensation step (S3): adding a basic catalyst to the mixed solution to carry out a condensation reaction. The molar ration of the basic catalyst and the acid catalyst 1.0:1.0 to 5.0:1.0.

In the basic catalyst/ethanol solution, the increase of the base catalyst content will significantly reduce the time of the condensation reaction (ie, the gelation time of the aerogel). The gelation time decreases to 2 minutes when the ratio of the base catalyst and the acid catalyst is 1.0:1.0, so that the content ratio of the basic catalyst relative to the acid catalyst can be managed to adjust the time required for the process.

When the condensation reaction in the condensation step (S3) is close to completion, the mixed solution will form a sol.

The dispersion step (S4)(S40): When the mixed solution is controlled under a pregel-like condition, a large amount of the hydrophilic dispersion solvent (S4) or a large amount of the hydrophobic dispersion solvent (S40) is added and rapidly stirred and emulsified to allow the mixed sol solution to be influenced the dispersion solvent under the conditions of rapid stirring, and the gel solution is formed into pearl-like or spherical closed shell-layered wet granules of aerogel. The most particle size of the wet granules of aerogel coarse up to hundreds of microns and the least one is about 100 nm. The particle size of the wet granules of aerogel is inversely proportional to the rate of agitation, and the wet granules of aerogel with particle size of hundreds of nanometers to hundreds of micrometers can be prepared.

The hydrophilic dispersion solvent can be water, treated water, deionized water, C1~C16 alcohols, C2~C16 ethers, C3~C16 ketones, C2~C16 esters, C1~C16 acids, C1~C16 amines and the like, especially for example, water, treated water, deionized water, methanol, ethanol, acetone, butyl ether, ethyl acetate, butyl acetate, formic acid, ammonia, and the like.

The hydrophobic dispersion solvent can be C3~C16 ketones, C2~C16 ethers, C2~C16 esters, C6~C16 aromatics or C5~C16 alkanes, C2~C16 halogenated ethers, C2~C16 halogenated esters, C2~C16 halogenated aromatics, C2~C16 halogenated alkanes, especially for example, acetone, butyl ether, ethyl acetate, butyl acetate, cyclohexane, n-hexane, toluene, kerosene, debarking, and the like.

The step of forming hydrophilic, hydrophobic surface of aerogel (S5) (S50): When the hydrophilic solvent (S5): water, alcohols, ketones, ethers, amines, acids is added to the mixed condensation solution of the R-olefinyl silicate, R-olefinyl silicone, and the R-olefinyl silicon coupling agent, will promote the hydrophilic group in the aerogel solution such as —OH, —COOH or —NH$_2$ present in the wet granules of aerogel shell layer, allowing the shell layer of wet granules of aerogel showing hydrophilic base shell structure. In contrast, the inner layer of the inner layer of the wet granules of aerogel presents a hydrophobic group structure; therefore, the prepared wet granules of aerogel are hydrophilic wet granules of aerogel.

After the hydrophobic solvent (S50): ketones, ethers, esters, aromatics, alkanes is added in the step of mixing the R-olefinyl silicate, R-olefinyl silicone, and the R-olefinyl silicon coupling agent, the hydrophobic groups such as —CH$_3$, —X, —C$_2$H$_5$ in the aerogel solution will promote to be formed into the shell layer of the wet granules of aerogel showing a hydrophobic shell structure. In contrast, the inner layer of the wet granules of aerogel presents a hydrophilic group structure; therefore, the prepared wet granules of aerogel are hydrophobic wet granules of aerogel.

The post-treatment step (S6) (S60): The wet granules of aerogel by a filter is filtered and obtained when the wet granules of aerogel are formed. The wet granules of aerogel is resulted from a large amount of the dispersion solvent. Furthermore, The wet granules of aerogel were dried in a high temperature flow bed dryer at 130~250° C., allowing the wet granules of aerogel to be quickly dried to obtain dry aerogel powder.

The coating layer of the hydrophilic and hydrophobic wet granules of aerogel prepared by the present invention were tested for water absorption properties. It is shown that the hydrophilic aerogels can absorb water quickly. The hydrophobic aerogels on the surface show obvious splashing characteristics to form a water columnar structure with water contact angle of 150 degrees.

In this way, it is possible to simultaneously produce spherical, uniform and highly porous hydrophilic and hydrophobic wet granules of aerogel, which can improve the appearance and structure uniformity of the wet granules of aerogel and improve its applicability. In addition, by virtue of this process can directly provide wet hydrophilic wet granules of aerogel and hydrophobic wet granules of aerogel of the technology, so that aerogel is easier to mass production and to expansion of the scale of industrial applications.

Figure 2:
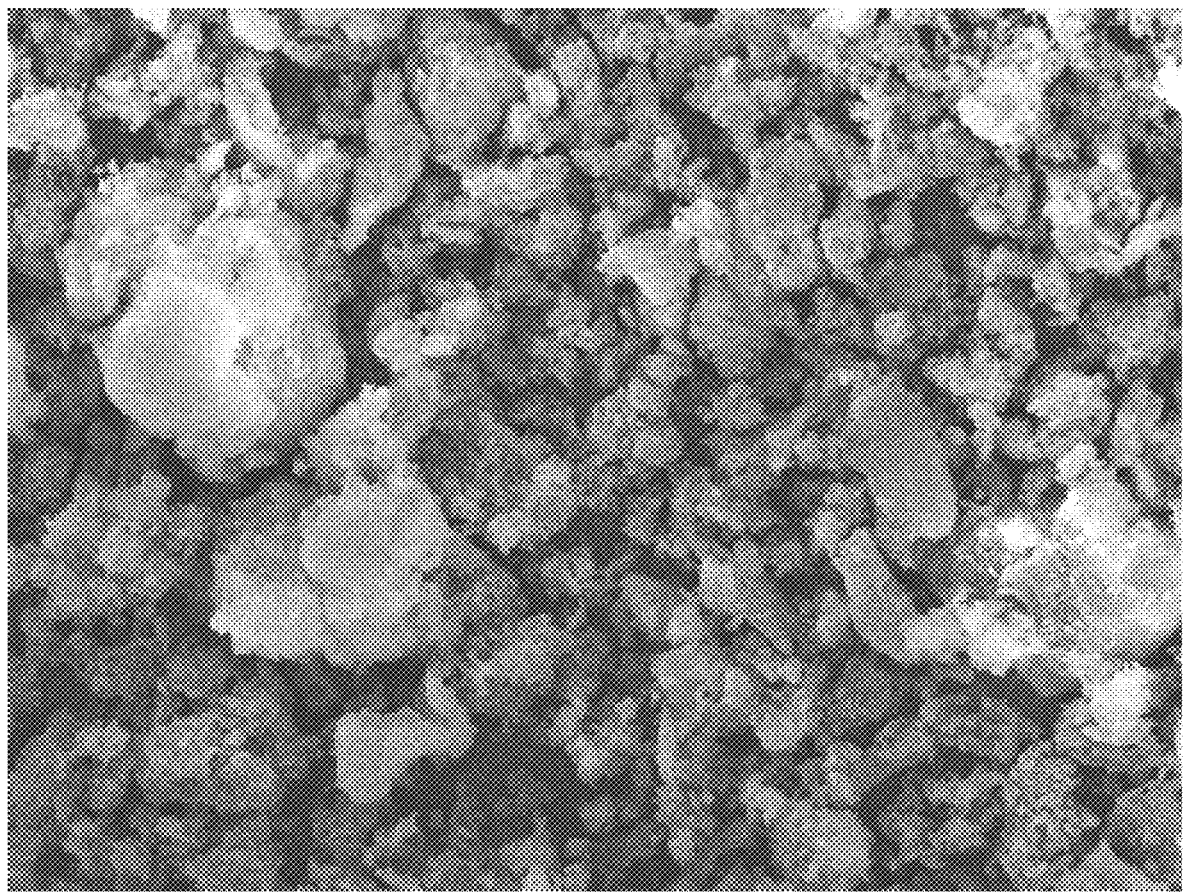
FIG. 2 is a micrograph of dry particles of the hydrophilic wet granules of aerogel according to the present invention.
Figure 3:
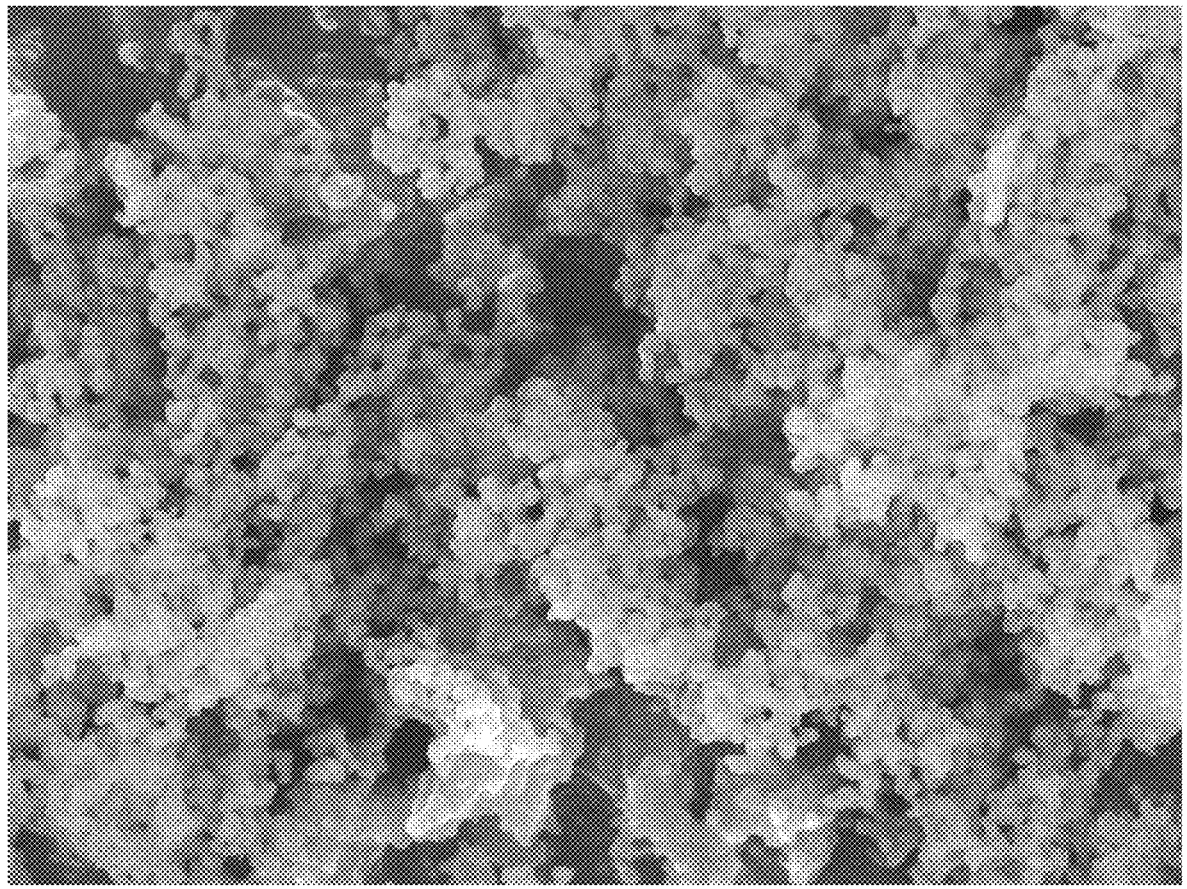
FIG. 3 is a micrograph of dry particles of the hydrophobic wet granules of aerogel according to the present invention.

Referring to FIG. 2 and FIG. 3, the scanning electron microscopy (SEM) is used to capture the appearance of hydrophilic wet granules of aerogel and the appearance of hydrophobic wet granules of aerogel. The micrographs of the distribution and appearance dimensions at different microscopic scales show that the prepared hydrophobic wet granules of aerogel have a uniform and homogeneous aerogel particle.

Figure 4:
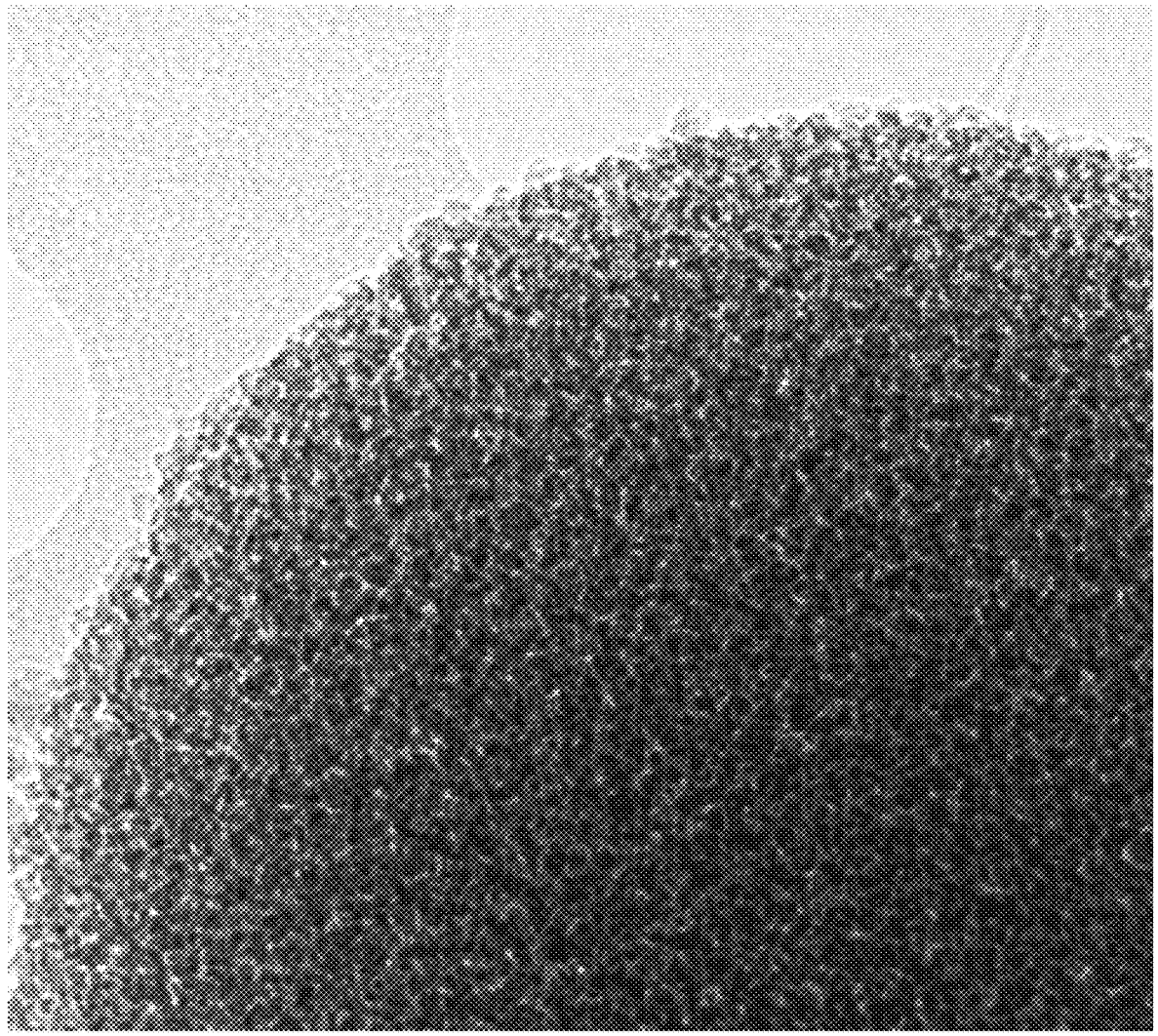
FIG. 4 is a micrograph of the hydrophilic wet granules of aerogel according to the present invention, shows the particle size of the aerogel is about 100 nm.
Figure 5:
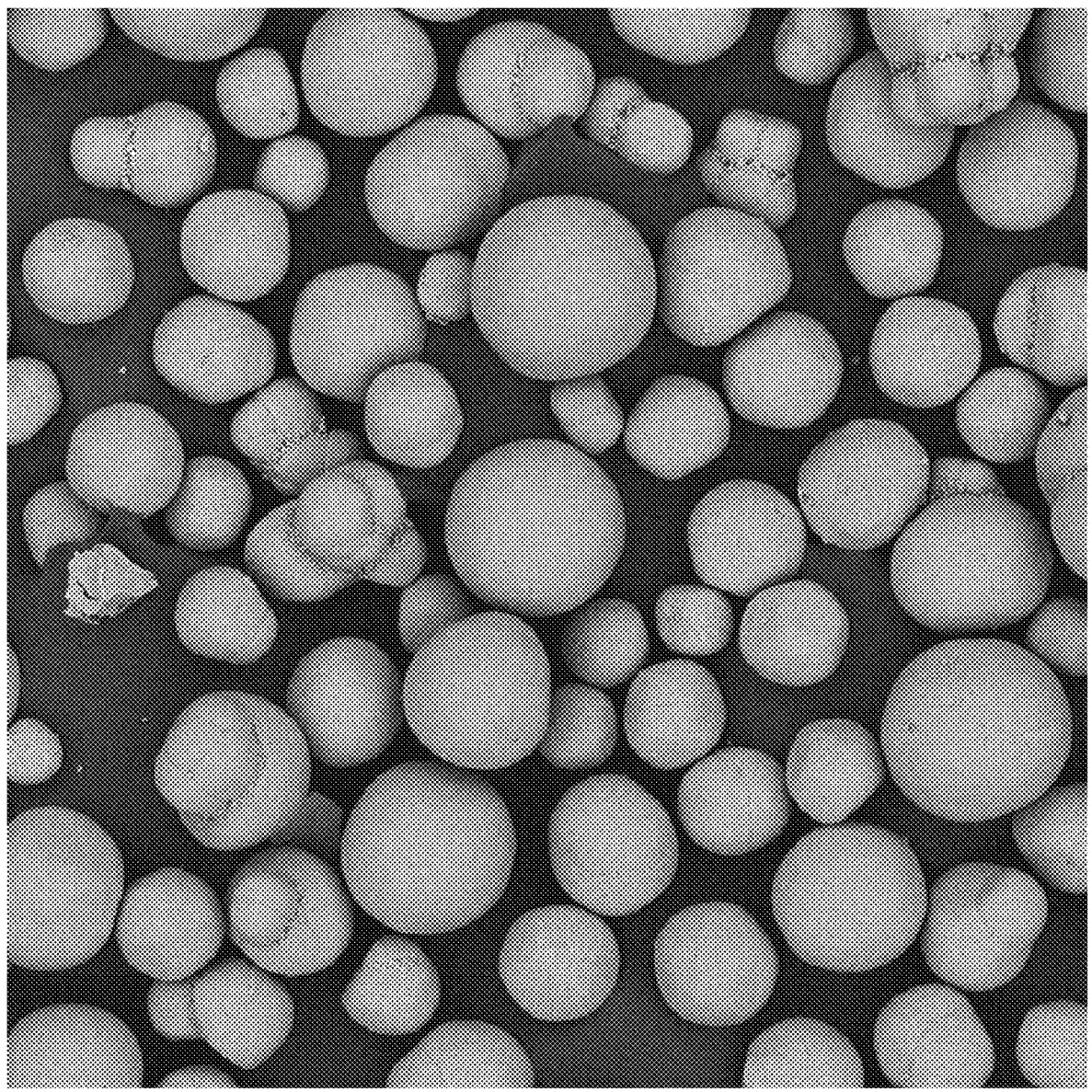
FIG. 5 is a micrograph of the hydrophobic wet granules of aerogel according to the present invention, shows the particle size of the aerogel is about 10 μm.

Referring to FIG. 4 and FIG. 5, the scanning electron microscopy is used to capture the hydrophobic wet granules of aerogel at different microscopic scale structure and particle size distribution. FIG. 4 shows that the present technique can prepare wet granules of aerogel with high homogeneity and a diameter close to 100 nm. FIG. 5 also shows that the technique can be prepared with high homogeneity and a diameter of nearly 100 μm of FIG. 5 also shows that the technique can be prepared with high homogeneity and a diameter of nearly 100 μm of airgel wet granules. The aerosol exterior structure prepared by this technique also has a uniform, homogeneous spherical appearance. The aerosol exterior structure prepared by this technique also has a uniform, homogeneous spherical appearance.

While the foregoing description of the embodiments has been fully understood, the embodiments described above are only preferred embodiments of the present invention when the operation, use and effects of the present invention are fully understood, and when the present invention is not limited thereto, Which are within the scope of the present invention, are within the scope of the present invention as defined by the appended claims and the description of the invention.

What is claimed is:

1. A method of preparing wet gel granule of aerogel, comprising:
   mixing: mixing a siloxane compound mixture with an organic mixed solvent to form a mixed solution, wherein said siloxane compound mixture includes at least R-olefinyl substance, said R-olefinyl being a functionally substituted olefin cluster having an olefin chain;
   hydrolysis: adding an acid catalyst to said mixed solution for carrying out a hydrolysis reaction;
   condensation and dispersion: adding a basic catalyst to said mixed solution to carry out a condensation reaction, and adding a hydrophilic dispersion solvent or a hydrophobic dispersion solvent during the condensation reaction, and agitating, to gel said mixed solution during agitation and produce multiple hydrophilic wet gel granules of aerogel or hydrophobic wet gel granules of aerogel, respectively.

2. The method as claimed in claim 1, wherein said hydrophobic dispersion solvent includes one or more solvents selected from a group consisting of ketones, ethers, esters, aromatics and alkanes; and wherein said hydrophilic dispersion solvent includes one or more solvents selected from a group consisting of water, alcohols, amines and acids.

3. The method as claimed in claim 1, wherein the dispersion step for hydrophilic wet get granules of aerogels includes: when the condensation reaction is close to completion, said mixed solution is first formed into a sol, and controlling said mixed solution under a sol-like condition and adding said mixed solution to said hydrophilic dispersion solvent of the incompatible system under the sol-like condition and performing rapid stirring, allowing the mixed sol solution to be affected by the dispersibility of the hydrophilic dispersion solvent under rapid agitation and gelling to form pearl-shaped or spherical hydrophilic wet gel granules of aerogel.

4. The method as claimed in claim 3, wherein said condensation includes adding hydrophilic dispersion solvent and allowing the wet granules of aerogel to present a hydrophilic group on a surface layer and in contrast a hydrophobic group on an inner layer, and the prepared wet gel granules of aerogel are hydrophilic wet gel granules of aerogel.

5. The method as claimed in claim 4, wherein said wet gel granules of aerogel are dried under 130° C.~250° C., thus converting said wet gel granules of aerogel into dried aerogel powder.

6. The method as claimed in claim 3, wherein said condensation includes adding hydrophobic dispersion solvent and then promoting the wet granules of aerogel to present a hydrophobic group on the surface layer and in contrast a hydrophilic group on the inner layer, and the prepared wet gel granules of aerogel are hydrophobic wet gel granules of aerogel.

7. The method as claimed in claim 6, wherein said wet gel granules of aerogel are dried under 130° C.~250° C., allowing said wet gel granules of aerogel to be formed into dried aerogel powder.

8. The method as claimed in claim 1, wherein said condensation includes regulating the diameters, porosity, pore sizes of said wet gel granules of aerogel according to preparation conditions, said preparation conditions comprises: the content of said siloxane compound mixture and said solvents, the viscosity of said solvents, the content of said acid catalyst, and said basic catalyst, the content of said dispersed solvent, and the speed of stirring.

9. A method of preparing wet gel granule of aerogel, comprising:
mixing a siloxane compound mixture with an organic mixed solvent to form a mixed solution;
hydrolysis: adding an acid catalyst to said mixed solution for carrying out a hydrolysis reaction;
condensation and dispersion: adding a basic catalyst to said mixed solution to carry out a condensation reaction, and adding a hydrophilic dispersion solvent or a hydrophobic dispersion solvent during the condensation reaction, and agitating, to gel said mixed solution during agitation and produce multiple hydrophilic wet gel granules of aerogel or hydrophobic wet gel granules of aerogel, respectively, wherein said siloxane compound mixture includes R-olefinyl triethylsilicate (RTES); wherein R-olefinyl is a functionally substituted olefin cluster, said R-olefinyl comprising amino ($-NH_2$).

* * * * *